United States Patent [19]
Griepentrog et al.

[11] Patent Number: 5,208,522
[45] Date of Patent: May 4, 1993

[54] MACHINE WITH MAGNETIC-BORNE ROTOR AND ELECTRICAL RADIAL FIELD MOTOR-GENERATOR

[76] Inventors: Hartmut F. L. Griepentrog, Veltstr. 17, 1000 Berlin 27; Herbert Weh, Wöhlerstr. 20, 3300 Braunschweig, both of Fed. Rep. of Germany

[21] Appl. No.: 19,678

[22] Filed: Feb. 27, 1987

Related U.S. Application Data

[63] Continuation of PCT/EP86/00413, filed Jun. 28, 1986.

[30] Foreign Application Priority Data

Jun. 29, 1985 [DE] Fed. Rep. of Germany ....... 3523343
Jun. 29, 1985 [DE] Fed. Rep. of Germany ....... 3523344

[51] Int. Cl.[5] ............................................. G05B 5/01
[52] U.S. Cl. .................................. 318/611; 310/90.5
[58] Field of Search ......................... 318/611; 310/90.5

[56] References Cited

U.S. PATENT DOCUMENTS

| | | |
|---|---|---|
| 3,079,574 | 2/1963 | Garcia . |
| 3,787,100 | 1/1974 | Habermann et al. . |
| 3,845,995 | 11/1974 | Wehde . |
| 3,955,858 | 5/1976 | Poubeau . |
| 4,281,384 | 7/1981 | Groom et al. . |
| 4,609,332 | 9/1986 | Miki et al. ...................... 310/90.5 X |

FOREIGN PATENT DOCUMENTS

| | | |
|---|---|---|
| 853607 | 10/1952 | Fed. Rep. of Germany . |
| 1202392 | 10/1965 | Fed. Rep. of Germany . |
| 3026339 | 1/1984 | Fed. Rep. of Germany . |
| 1537842 | 7/1968 | France . |
| WO87/00360 | 1/1987 | PCT Int'l Appl. . |
| 1410219 | 10/1975 | United Kingdom . |

Primary Examiner—William M. Shoop, Jr.
Assistant Examiner—Saul M. Bergmann
Attorney, Agent, or Firm—Salter & Michaelson

[57] ABSTRACT

Rotating machine with a rotor (44) with an inductor of an electrical radial field machine (48) arranged on the rotor (44), which radial field machine is designed for absorption of the radial bearing forces acting on the rotor, and with an inductor of an axial field machine (46) arranged on the rotor (44), which axial field machine is designed for absorption of the axial bearing forces acting on the rotor. For normal force control, means for field control with the aid of current influencing are provided in the stators of the two electrical machines, which for their part are each subdivided into four quadrants with their own regulating units. The two electrical machines (46, 48) are of multipole design, there being at least two poles per winding quadrant. The axial field machine (46) is provided with three controllers for the stabilization of three degrees of freedom and the radial field machine (48) is provided with two controllers for the stabilization of two degrees of freedom.

8 Claims, 4 Drawing Sheets

MACHINE WITH MAGNETIC-BORNE ROTOR AND ELECTRICAL RADIAL FIELD MOTOR-GENERATOR

This application is a continuation of International Application PCT/EP86/00413 filed Jun. 28, 1986.

The invention relates to a rotating motor-generator with a rotor with axial and radial magnetic bearing and with magnetic field producing means of an electrical radial field motor-generator arranged on the rotor.

Rotating machines of this type, in which the radial field motor-generator is designed as an electromotive drive, are known from U.S. Pat. No. 2,436,939, British Patent Specification GB 2,022,703A or German Patent Specification DE 2,825,400C2 and German Offenlegungsschrift 2,163,256. In these cases it is known to design the magnetic bearings such that they are simultaneously effective with a radial component and an axial component.

Magnetic bearings make it possible to bear the rotor without friction and resistance to wear. Magnetic bearings can be made in controlled or uncontrolled form. Combinations of these two types of bearing are also used. The controlled magnetic bearings are based on the function of controlled electromagnets.

For radial bearings, normally two coils situated in directions perpendicular to each other are effective for the generation of the magnetic field. After comparison with the set value of a controller, a signal is passed from a sensor measuring the bearing gap to an amplifier (power regulator) determining the current passed through the coils. Thus, after a disturbance in the rotor position, a gap correction can be made and the running of the rotor stabilized in the respective axis. Axially acting magnetic bearings can also be designed similarly so that, in the combination of magnetic bearings, the necessary force can be generated in the main directions situated perpendicular to one another (vertical, horizontal and axial) with the aid of controllable magnetic fields.

As the magnetic bearings of a conventional type have ferromagnetic circuits for limitation of the magnetization power, the upper limit of the field densities is conditioned by the magnetic saturation of the circuits.

The force density which can be generated is thus limited; generally it does not exceed 20 N/cm$^2$. This in turn calls for relatively large-area arrangements for the poles of the magnetic bearings. Rotors with large mass, such as for example centrifugal mass power stores, or rotors of machines of high power density, on which large external forces act, thus require a large bearing volume in comparison with the dimensions of the normal shaft. The bearings themselves contribute for their part not inconsiderably to enlarging the rotor body.

In most applications, a coupling in or out of the power is additionally aimed for with the aid of an electromagnetic converter, in other words an electrical motor or generator. The latter likewise operates contactlessly, permits a certain bearing clearance and makes driving or braking of the rotor possible without interconnection of gears. Electrical motors or generators are likewise based on the application of magnetic fields which are in inversion to electrical currents. Since, similarly to the case of normal magnetic bearings as well, iron is used to increase the magnetic conductivity, the fields have the characteristic that normal force densities are generated by them in the same order of magnitude (as in the case of the bearings). Furthermore, there is the characteristic that deviations from the positional symmetry induce force effects which tend to lead to a further increase in the imbalance. The normal force generated by an electrical motor or generator acts in a destabilizing manner for the suspension condition of the rotor. Additional forces caused by the motor or generator must likewise be absorbed by the bearing.

If magnetic bearings are used in combination with electrical motors or generators acting on the same rotor, it may be necessary for the radial bearings to be over-dimensioned by considerable amounts. As a rule, this involves undesired enlargements in the overall design.

Apart from the considerable accumulation of mass, indirect consequences are also to be expected. For example, a lengthening of cylindrical radial bearings with short rotors also leads to an increased tendency for field inhomogeneities, in other words to uneven field distribution in the bearing. If, for limitation of this effect, the bearing area and the gap size is enlarged, the magnetization requirement of the bearings increases and so the attainable rate of force change for certain control adjustments of the current is reduced. Consequently greater expenditures on the energy supply and energy preparation side are necessary.

Thus, in the combination of electrical machine and magnetic bearing as a rule disturbing interactions occur due to magnetic fields, which may have effects on the applicability of such combinations.

Furthermore, magnetic bearings are known with which the magnetic field is generated from a combination of permanent magnet and electric coil. Then the steady-state normal force is generated with the aid of the permanent magnets and the dynamically necessary controllable field components are generated by the coil excitation.

Such bearings are dynamically more favourable than purely electrically excited bearings as the stabilizing force component manages with small control adjustments and the current changes at a given voltage are relatively fast.

The object of the invention is a magnetic bearing or rotors with electrical energy coupling in or out in which disturbing interactions between the main functions, generation of normal force and driving force, are avoidable.

This object is achieved according to the invention by a machine in which an electric radial field machine is designed for absorption of the radial bearing forces acting on the rotor, and in which, furthermore, an electric axial field machine is provided which is designed for absorption of the axial bearing forces acting on the rotor.

In this case, the electric machines may be designed and operated as electromotive drives or as electric generators, it also being possible for the electrical motor-generators to be operated in electric generator manner, and hence the term motor-generator is used herein to generally describe machines of this type.

For normal force control, means for field control with the aid of current influencing are preferably provided in the stators of the electrical motor-generators.

Preferably, the stators of the electrical motor-generators which serve as axial bearing or radial bearing, are each subdivided into four winding quadrants with their own regulating units.

Expediently, the field of the axial field motor-generator should be effective on a greater diameter than the field of the radial motor-generator.

The axial field motor-generator is expediently provided with three controllers for the stabilization of three degrees of freedom and the radial field motor-generator is provided with two controllers for the stabilization of two degrees of freedom.

For the neutral position, or for start-up of the machine, a magnetically acting auxiliary bearing, generating axial forces, is expediently used additionally.

The two electrical motor-generators, namely the axial field motor-generator and the radial field machine, are preferably of multi-poled design, there being at least two poles per winding quadrant.

For no-load excitation, permanent magnets are expediently provided on the rotor.

The armature winding is preferably designed with a phase number greater than three and fed by invertors which make possible a separate current influencing of the individual phases.

As far as permanent magnets are provided on the rotor for no-load excitation, a normal force influencing can take place by phase changing (shifting) of the armature current distribution with respect to the permanent magnets.

The coils of the armature winding surround the yoke, preferably as ring coils.

The control of the driving force is performed expediently as a function of the size of the current.

In the case of the axial field motor-generator, the measured values from four gap sensors may serve for the determination of three control commands with the aid of a logic computer for the average gap and two rotations. These are thereby converted with the aid of a further computer into control commands for four partial invertors for phase shifting.

The invention is illustrated by way of example in the drawing and described below in detail with further features with reference to the drawing, in which:

FIG. 14 shows a further embodiment of the bearing according to FIG. 4.

Figure 1:
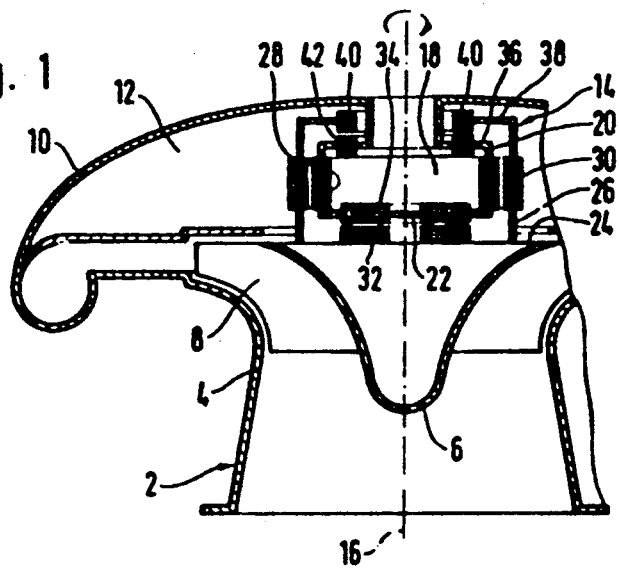
FIG. 1 shows a diagrammatic cross-section through a turbo-machine according to the invention.

FIG. 1 diagrammatically represents, in axial section a turbo-machine 2 with a casing 4, in which an rotor 6 rotates which is provided with blades 8. The casing 4 is provided with a pressure-tight cover 10, by which a space 12 is formed, in which the elements 14 for driving and bearing the rotor are arranged.

The cover 10 is pressed in the middle given by the rotational axis 16. The space 18 thereby formed has here a cylindrical wall 20 and a substantially flat base 22, which is parallel to the rear 24 of the rotor 6. Furthermore, arranged coaxial to the rotational axis 16 at the rear 24 of the rotor 6 is a cylindrical ring-shaped wall 26. The two cylindrical ring-shaped walls 20 and 26 form the armature and the stator of an electrical internal-pole radial field motor. The magnetic flux-carrying parts of the stator of the radial field motor are accommodated on the ring-shaped wall 20 with the windings 28. Arranged on the wall 26 of the rotor 6 are the corresponding magnetic circuit parts 30. In a similar way, at the rear of the rotor 6 are arranged magnetic circuit parts 32 of an electrical axial field motor, the associated magnetic flux-carrying stator parts of which are arranged with the windings 34 on the base 22.

The cylindrical ring-shaped walls 20 and 26 are each provided with an inner flange 36 and 38 respectively, remote from the rotor. The flange 38 bears magnetic circuit parts 40 and the flange 36 bears magnetic flux-carrying parts with windings 42. These parts may be parts of a further electrical axial field motor. However, they may also merely be provided for the generation of a lift field, for example in order to bring the rotor into operating position before switching on.

The armature windings of the electric motors are fed with current of variable frequency, by which a rotating field is generated, which transfers the necessary torque to the rotor. The radial field motor and the axial field motor are further designed and controlled such that the two motors are simultaneously effective as magnetic radial bearing and axial bearing, respectively. If necessary, additional windings or additional magnets may be provided for this.

In the case of the exemplary embodiment represented in FIG. 1, no shaft seal is necessary. Furthermore, all winding terminals may lie outside the medium in which the rotor operates. The parts of the drives connected to the rotor on the other hand lie in the operating medium. If necessary, the space 12 under the cover 10 may also be filled with a foreign gas.

In the case of multi-stage machines, each stage should be provided with a rotor drive, as described above. The individual rotors can then be operated optimally in each case corresponding to the compressor characteristic.

The turbo-machine represented is described as a compressor. However, the rotor may also be designed as a turbine wheel, the electrical motor-generator parts then operating as generators. The rotor may also be a centrifugal mass of an energy store or a rotating platform or disc of some other type.

For the generation of stably acting, controlled normal forces, the electrical machines are provided with regulating units and are modulated according to the rotor position via controllers. This normally also means a subdivision of the machine into several controllable units separated around the periphery.

Thus, a radial bearing may be implemented by subdividing the motor-generator winding into four quadrants with separate control adjustment, but in one structural unit.

Furthermore, it may be necessary that, instead of one motor-generator unit, two or possibly three units with differently acting normal forces are used. There may thus be a subdivision of the machine power over two or three units.

The functional integration of normal force control and tangential force generation in the electrical machine brings about a considerable simplification for the configuration of the field producing means on the rotor body and its electromagnetic stator components. At the same time, in virtually all cases the elimination of separate magnetic bearings makes for more favourable dimensioning of the electrical machine.

The space-saving and mass-saving arrangement of the entire system means higher power density, more favourable shaping and, as a rule, better efficiency for energy conversion. The required control actions for normal force influencing depend on the number of force directions to be stabilized or controlled. The number of control actions is equal to or greater than the number of degrees of freedom. In the case of a rotor to be electrically driven, of the total number of 6 (three coordinate directions plus three rotations), one degree of rotation freedom is occupied by the drive. Thus, five degrees of freedom are to be controlled by the bearings. Depending on the number of bearing motor units, this can be achieved with a varyingly large number of controllable windings or invertor groups.

Figure 2:
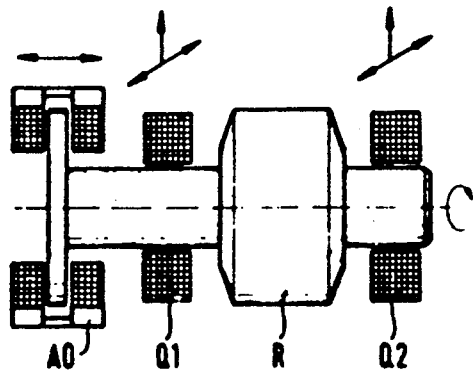
FIG. 2 shows the bearing principle of a rotor with axially and radially acting magnetic bearings.

The normal design represented in FIG. 2 consists of two radial bearings Q1 and Q2 and an axial bearing AO, thus altogether of three motor units. With a subdivision into four control quadrants per radial bearing, in each case two controllers are to be used per radial bearing. The four controllers of the two radial bearings then make it possible to control two main directions (situated perpendicular to each other) and two rotations, in other words four degrees of freedom. The axially acting bearing controls an average gap and undertakes the stabilization of the fifth degree of freedom. The corresponding motor must generally be able to generate 2-sided force effects. Altogether, $2 \times 4 + 1 = 9$ invertor units are to be provided.

If the axial force-generating motor A is arranged on adequately large diameter, with subdivision of this motor A into four winding sections with four invertor units, both an average gap can be controlled by the sum of the axial forces and two rotations can be controlled by respectively opposing control adjustment of opposite quadrants. Thus, with the axial bearing, three degrees of freedom are controlled via four regulating units.

Figure 3:
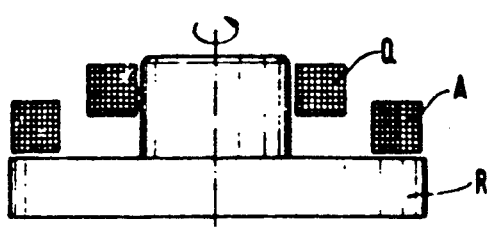
FIG. 3 shows diagrammatically the bearing of a rotor according to the invention.

As FIG. 3 shows, in this case it suffices to have a further radial bearing formed by an axial field motor-generator Q, with the aid of which radial bearing the forces are controllable in two main directions with four regulating units. In this configuration with eight adjustable winding units motor-generator units A and Q permit the control of five degrees of freedom. As well as the minimization of the number of invertor units the reduced number of electrical motor-generators from three to two is an important feature for a design especially appropriate for the system.

An important role is played here by the question of the design or integration of the electrical machine with the rotor R to be borne. In the case of steel rotors, for example the magnetic keeper may be undertaken by the rotor body. There thus arises a close connection between the system components. The rotor body undertakes both mechanical and magnetic functions. At the same time, it may be necessary to modify the shaping of the rotor in a suitable way.

The evident simplification which can be achieved by a multiple degree of freedom control with the axial bearing is made clear by the comparison of FIG. 3 with FIG. 2. This makes use of the fact that a static preloading is given by the downward acting rotor weight.

For the vertical bearing, it is sufficient to generate axial forces acting in one direction by the axial field motor-generator A (in the sense of the upward acting support force). Downward acting forces need not be applied. Greater axial forces occur in the case of turbo-motor-generators, which are dependent however on the delivery rate and thus the speed. They likewise act only in one direction. Thus it also again appears possible to develop the axial field machine forming the axial bearing in single-sided manner even with horizontal shaft.

Figure 4:
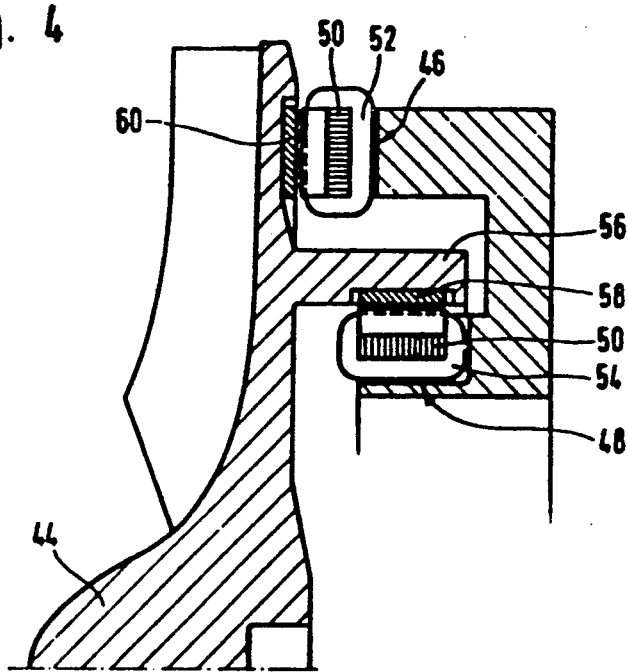
FIG. 4 shows, in a partial section, the bearing of a rotor with a radial field machine and an axial field motor-generator.

FIG. 4 shows the rotor 44 of a turbo-machine which is driven and borne by an axial field motor-generator 46 and a radial field motor-generator 48. The yoke 50 of the stator is diagrammatically reproduced. It bears the stator windings 52 and 54, which are the armature windings. They surround the yoke 50, here as ring coils.

On the inside of a cylindrical ring-shaped extension 56 at the rear of the rotor 44 are embedded permanent magnets 58, which generate the no-load field of the radial field motor-generator. In the same way permanent magnets 60, which generate the no-load field of the axial field motor-generator, are embedded opposite the armature winding 52 of the axial field motor-generator at the rear of the rotor base.

Figure 5:
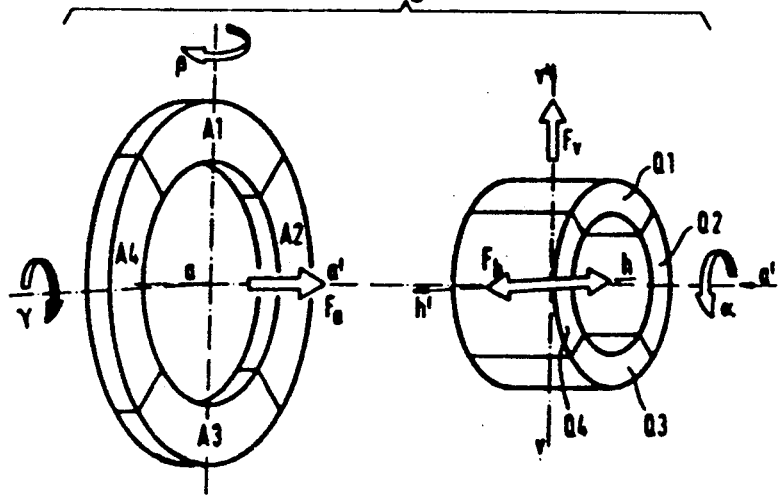
FIG. 5 shows in a diagram the subdivision of the armature windings into four quadrants in each case.

The subdivision of the armature windings into four quadrants in each case, offered for the axial field motor-generators and the radial field machine, is diagrammatically represented in FIG. 5. The axial field motor-generator and the radial field motor-generator here fulfil simultaneously the function of the radial bearing and axial bearing, respectively, as specified above.

As described with reference to FIG. 4, in the case of both motor-generators, the no-load field is generated by the permanent magnets 58, 60 arranged at the rotor 44. The steel body of the rotor is suitable for absorption of the peripheral stresses effected by the centrifugal forces; at the same time it carries the magnetic flux. In both cases, the stator winding is made in the form of a multiphase winding with ring coils 52, 54, which surround the yoke 50. The arrangement of the magnets in the extension 56 of the rotor and the inner-lying stator make possible the introduction of the centrifugal forces of the magnets into the rotor body without a special holding device.

Instead of excitation by permanent magnets in the steel rotor, a passive rotor of steel with salient poles in the form of a reluctance rotor in combination with a multi-phase winding is also applicable.

It is of significance that the magnetic field can be changed in a simple way for normal force influencing. The integral over the magnetic flux density squared determines the normal force, it being necessary in the case of the radial field motor-generator to take into account the curvature of the field space. It must be noted for the field influencing based on the stator currents that both the peripheral forces (for the drive) and the normal forces depend on the currents. As will be described in more detail, the adjustability of the field is not, however, exclusively restricted to reluctance motor-generators with multiphase windings; in the case of permanent-field motor-generators as well, an adequate adjustability of the normal forces can also be achieved by the armature currents.

It is now assumed that the bearing of rotors by magnetic fields is of particular interest for high-speed applications. In the case of machines with high circumferential speed, there arise feed frequencies for the stator currents far in excess of 50 Hz. Thus, the operation of motors necessitates invertors which make possible a change in the direction of current (alternating currents) in an adequately short time. This requires that the commutating properties of the circuits formed by switching elements and winding phases have to be favourable. This requires short switching times in the case of the semi-conductor elements and small inductances of the winding. Short switching times in the case of the invertor can be achieved by the application of switchable semi-conductor elements such as transistors or GTOs. The corresponding permissible switching frequencies lie in the kHz range. This allows multi-pole electrical motor-generators to be operated at high power density. This also makes it possible to divide the machine winding into four quadrants Q1 to Q4, each quadrant surrounding several poles. Invertors with frequencies above 1 kHz have module powers up to several 100 kW according to the capacity of the semi-conductor elements. For motor-generators with rated outputs up to or in excess of 1 megawatt, a subdivision of the invertors into several independently adjustable units is thus not a disadvantage in principle.

In comparison with drives with conventionally borne rotors and an externally coupled motor, the first main item of additional expenditure is the proportion of control of the partial invertors for normal force influencing. The extent of power electronics components (design rating of the invertors) increases only insignificantly by the function of the magnetic bearings. However, related to this is the question as to the type of adjustment process chosen for field influencing.

The possible adjustment processes for the normal forces are dependent on the type of the electrical motor-generator. As already described, the normal force in the individual motor-generator quadrants is proportional to the integral over the magnetic flux density squared in the air gap. The curvature of the field space must be additionally taken into account thereby. Consequently, all motor-generators with which the stator winding (and its currents) fed from the invertor and the flux density can be changed are suitable for normal force influencing. Especially desired in this case are such control processes in which the flux density is adjustable in two directions with respect to the normal value.

Thus, for example in the case of the radial field motor-generator effective as radial bearing, an increase in the normal force may take place in quadrant Q1 and a reduction in quadrant Q3. Furthermore, the flux density change is to be performed very quickly, so that there is only a short delay time before restoration of the equilibrium position (and a small rise time). See FIG. 5 in this respect.

A quick positional correction also means that only small discrepancies from the set position arise. This in turn makes it possible to maintain a small bearing gap nominal value. The latter is much desired because the material utilization on magnetic bearings and electrical machines increases with decreasing nominal gap. High bearing stiffness can be achieved more easily with small nominal gaps than with large. An adequately high bearing stiffness by a dynamically very effective control is very important in conjunction with quickly rotating bodies.

The influencing of the magnetic field density is expediently performed in the case of reluctance machines in a way corresponding to German Offenlegungsschrift DEOS 3,401,163, (U.S. Pat. No. 4,663,551) such that the coil currents assigned to the pole gap are increased or decreased via the gap control circuit. As a result, a field change approximately proportional to the current occurs in the region of the small gap (pole region), which field change is the cause for the normal force influencing. The changing of the amplitude value of the currents is conditional on the invertor and the direct-current intermediate circuit (DC-link) having a voltage reserve (voltage range) of corresponding magnitude. In the application of multi-phase windings, it is possible to achieve different normal force influencing in corresponding winding regions of a reluctance machine. However, reluctance machines do not represent the best solution for the drive problem for all applications.

If permanent-field synchronous machines are to be used, a field influencing with the aid of the armature currents must initially be regarded as not really suggesting itself. The permanent magnets generate a magnetic field which cannot be influenced from outside and is to be regarded as no-load field. It is possible to achieve strengthening or a weakening of the field by the field components generated by the armature currents being shifted in circumferential direction with respect to the no-load field (in other words with respect to the poles of the P magnets). At the same size of armature currents, only their relative position to the rotor is changed. As far as the capability of influencing the field is concerned, an armature field which is not too small in comparison with the field of the permanent magnets proves favourable in this case. The necessary size of the armature field related to the density of the no-load field determines the size of the normal force range. However, a limitation of the armature field is desired for several reasons. As is known, an excessive proportion reduces the attainable force density in the circumferential direction, in other words reduces the power density and necessitates a strengthened design of the invertor.

Figure 6:
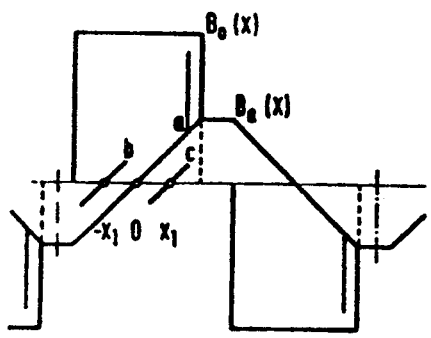
FIGS. 6 and 7 show, in the diagram, the effect of an armature field shift with respect to a no-load field generated by permanent magnets.
Figure 7:
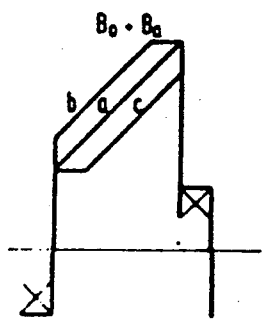

In the diagram reproduced in FIG. 6, $B_o$ is the square-drawn profile of the (no-load) field generated by the permanent magnets. The armature field, characterized by $B_a$, reaches at its maximum value less than half the no-load field. The armature field $B_a$ is now assumed to be displaceable. The curve a shows that position in which the associated armature currents generate the largest thrust force. In FIG. 7, the sum $B_o + B_a$ given by superimposing both field components is plotted. If $B_a$ is shifted with respect to the no-load field, changes occur in the size and distribution of the resulting field density.

Figure 8:
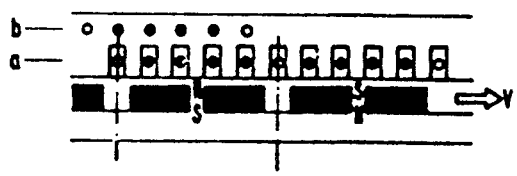
FIG. 8 shows diagrammatically the armature field shift.

A relative shift of $B_a$ to the left by $x_1 = 1/5\tau$ (curve b), as is represented in FIG. 8, brings an increase in the local flux density under the pole. Conversely, a shift to the right by the same amount (curve c) brings a decrease in the flux density. As the normal force density is proportional to the square of the resulting B values, clear differences arise for the average force density.

Figure 9:
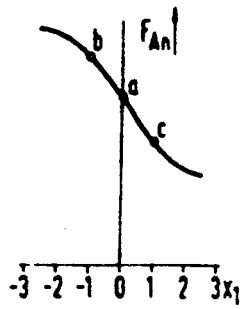
FIGS. 9 and 10 show diagrams of the force density or force in tangential direction averaged over the pole pitch.
Figure 10:
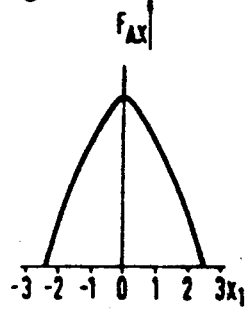

In FIG. 9, the force density averaged over the pole pitch is plotted as a function of the size of the shift. Increasing shift to the left with respect to the initial position a leads to a force maximum at $-2.5x_1$, while with shifting to the right a force minimum occurs at $+2.5x_1$. As represented in FIG. 10, the force generated by the armature currents in the circumferential direction drops from the optimum position a onward and at $+2.5x_1$ reaches the value zero.

Figure 11:
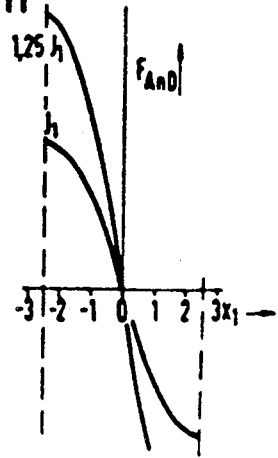
FIG. 11 shows in a diagram the difference of the normal forces.

FIG. 11 shows the difference in normal forces with opposing control adjustment. The two curves show that a comparatively small current increase (from $I_1$ to $1.25 I_1$) effects great force increases.

The distribution of $B_a$ as a function of x assumed for FIG. 6, for example according to curve a, establishes itself with the current distribution shown in FIG. 8 with five slots (phases) per pole and a magnet arrangement with a pole width of $4/5\tau$. A left shift by one slot pitch (case b) means that then the commutating coil with the current zero creeps out of the pole gap underneath the neighbouring pole. This also changes the electrical conditions for commutation. The induced voltage gives intensified support to the current change.

The assumption of equal-size currents in the slots located respectively underneath the poles is conditional on the current control for the individual phases. If any influencing of the current size by intermediate switching of the invertor is dispensed with, the coil current freely establishes itself corresponding to the effective voltages. This operation is advisable in the upper part of the speed range, in other words at high frequencies. If it is assumed that the current at the same time adopts the desired value at the highest flux density, it is found that the currents establishing themselves at small flux density are greater. This leads to the field increase of $B_a$ as a function of x being greater and at the same time non-linear. In comparison to the conditions represented in FIGS. 6 and 7, an armature field deformation takes place and the effect of the field change on the normal force is intensified. For the peripheral forces, there is an opposing effect. The effectiveness of the control adjustment for stabilization of the suspension function can be influenced to a limited extent by the mode of operation of the invertor.

As is known, the use of permanent magnets for generation of the no-load field has the disadvantage that only part of the overall field can be influenced by the current. However, an advantageous effect is that with gap changes there is also only a reduced effect on the normal force and thus a reduction in the destabilizing effect. This is related to the proportion of the magnetic resistances represented by gap and permanent magnet for the field of the armature. The air gap only occasions a small proportion of the overall resistance. Thus it may be assumed that, with a permanent magnet height which amounts to about five times the air gap, a gap change of 10% of the nominal gap only brings about a field change of less than 2% and a normal force change of less than 4%. The force control adjustments described, which would occur with non-changed gap, obviously can be transferred in principle to all the applications in which relatively small changes of the gap occur. However, the magnet height should in any event be clearly greater than the gap. At the same time, measures must be taken for measuring instrumentation to record precisely and without delay even very small gap changes.

Gap sensors are used for this, which are capable of depicting gap deviations of about 1% of the nominal value by an electrical signal. The opposing control adjustment assumed above for two opposite winding quadrants is advisable because this produces approximately a doubling of the force effect. However, it does not appear absolutely necessary for this pre-condition to be met for stabilization of the suspension process. Insofar as the running of a rotor takes places without external disturbances, with low-delay response, relatively small control adjustments suffice for stabilization. It then appears adequate to use, for example, only the support force generated in the upper range of a radial bearing formed by a radial field machine for dynamic stabilization, while the winding of the lower quadrant only undergoes steady-state control adjustment.

It is expedient that axial bearings formed by the axial field machine are designed such that, under the conditions prevailing at the time (normal operation), the axial force is generated in the field position—see FIG. 8—i.e. without a weakening of the peripheral force. In this operating state, the electrical machine delivers its power at the smallest losses. The necessary control adjustments for dynamic stabilization then occur with only small amplitude and very briefly. They can be compensated by slight angle shifts of the current distribution. The power drop caused thereby only leads to a very slight current increase for the generation of the average circumferential force.

In the case of the radial bearing, on the other hand, a constant control adjustment of the quadrants Q1 and Q3 is necessary for excitation of the magnetic force compensating the rotor weight. It must be taken into account for the design of the electrical machine that another suitable increase in this force is necessary for correction of dynamic effects.

The described machine type of the permanent-field synchronous machine with armature current shift is therefore very well suited for normal force influencing because the operation of current shift can be implemented without notable time delay. Particularly favourable are the switching characteristics of an armature winding of multi-phase type design in the case of this machine. The armature inductance is very small due to the arrangement of the permanent magnets at the air gap. The high commutation speed at given voltage connection is ensured in comparison with other machines. In this type of construction, electrical machines can be operated at particularly high frequencies.

For the control of the drive force, which effects the rotation of the rotor, the size of the current (current amplitude) is used.

In the cases where the radial bearing is highly loaded by the steady-state control adjustment for support force generation, it may be recommendable to exclude the two quadrants Q1 and Q3 from the control of the drive force.

In applications which require a speed-dependent axial force and, at the same time, speed-dependent control adjustments of the current amplitude for the control of the peripheral force, the additional application of a magnetic auxiliary bearing, as represented diagrammatically in FIG. 1, is advisable for temporary generation of an axial force. The auxiliary bearing may be included here in the control of the "axial shift" degree of freedom (main direction a, a'). In the range of the nominal load, the bearing forces are generated to the greatest possible extent or completely by the two electrical motor-generators A and Q; the auxiliary bearing may then be disconnected or operated at only very low force.

Figure 12:
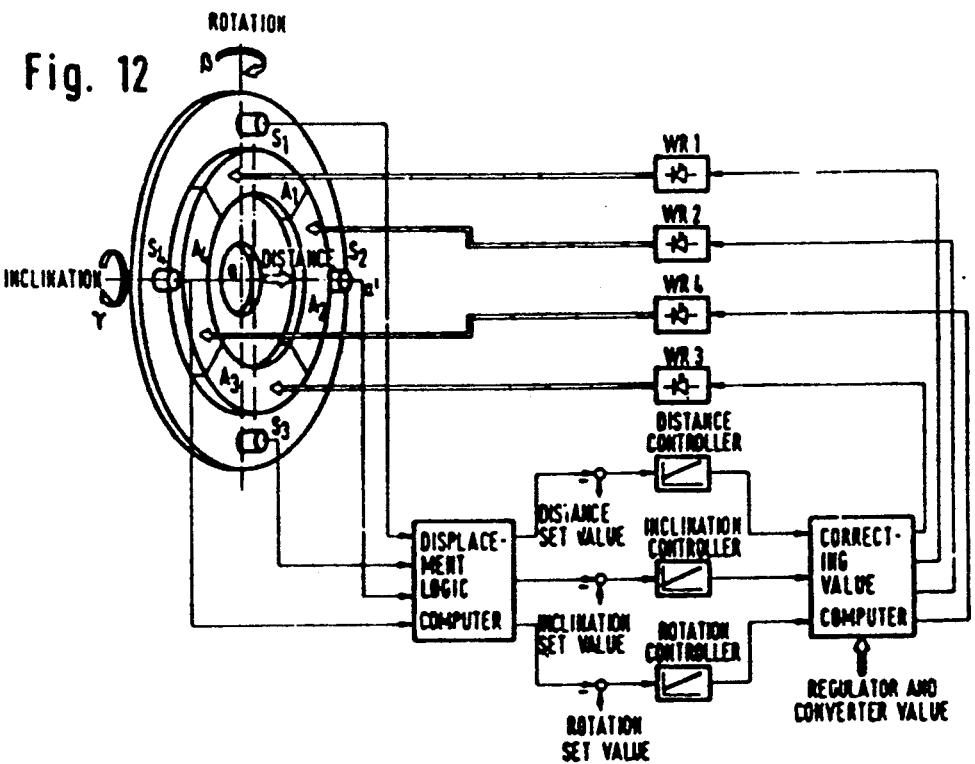
FIGS. 12 and 13 show the controlled diagrams for the armature winding of the axial field motor-generator and the radial field motor-generator, respectively.

FIG. 12 shows the control diagram of the armature winding of the axial field motor-generator for the control of the three degrees of freedom for the distance aa', the rotation $\beta$ and the inclination $\gamma$. The actual values of the position are measured by the sensors S1–S4 and converted in a displacement logic computer into the coordinates of the degrees of freedom distance, inclination and rotation.

After the set value comparison, a controller signal for each of the three degrees of freedom is produced in the associated PID controllers for the positional correction. These controller signals are converted in a correcting value computer such that they can be used by four regulating units WR1-WR4 for phase shifting of the current distribution in the four winding quadrants A1-A4 of the machine.

Figure 13:
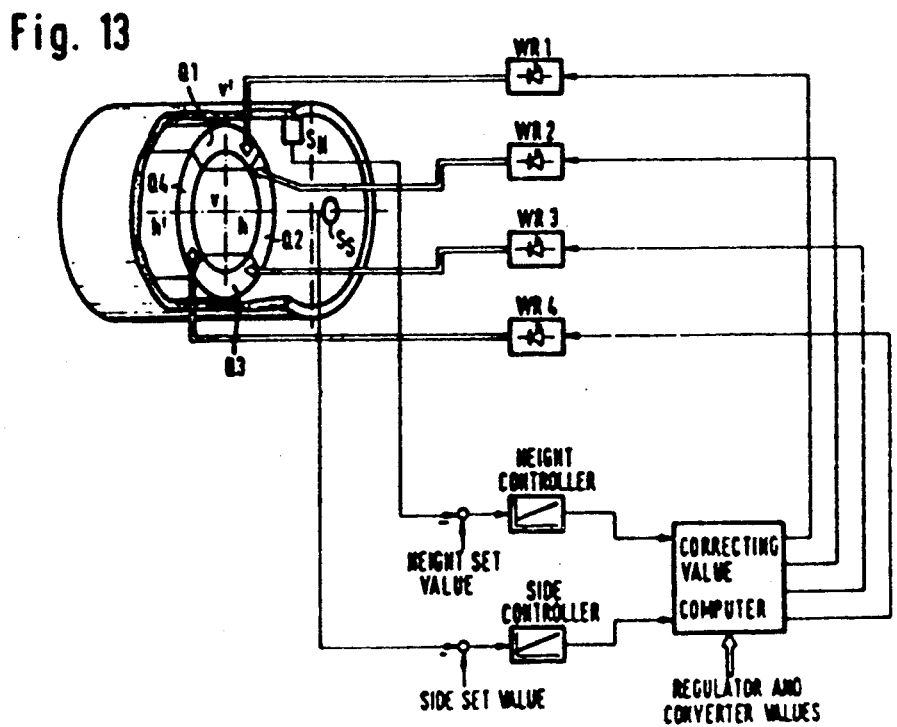

FIG. 13 shows an analogous functional sequence for the control of the radial bearing. The two degrees of freedom for the height vv' and the side hh' are adjusted.

Two sensor signals $S_S$ and $S_H$ determine the actual position values. After comparison with the set values, the two controllers determine the correction commands for height and side. The latter are converted in a correcting value computer for processing in the four regulating units WR1-WR4 of the radial bearing.

It should be emphasized that although the described control with the aid of phase shifting of the armature current distribution is restricted to relatively small gap movements, it nevertheless makes possible setting down and lifting up operations of the rotor in the suspended state.

These operations are implemented by set value changes according to a given development of the control, and thus in suspended manner. The support force must still correspond to the rotor weight at the greatest deflection from the nominal gap.

The lowering operation bears a close relationship to the question as to an emergency bearing and its play. In general, it may be assumed that mechanical emergency bearings with a play of about 1 mm find application, so that bearing gaps which are slightly larger than about 1 mm present themselves for the axial field motor-generator and the radial field motor-generator.

FIG. 14 represents, as an example, the bearing of a high-speed rotor with the main bearings A and Q (which are electrical machines), which in principle corresponds to that according to FIG. 4. Therefore, the reference numerals of FIG. 4 have been used for corresponding parts and references made to this extent to the description of FIG. 4. In addition, a magnetic auxiliary axial bearing 62 is provided which is excited briefly during start-up, as well as two mechanical emergency bearings 64 and 66, by which the rotor 44 is borne on a stationary axial pin 68 in a stationary housing part 70. The axial pin 68 is designed here with a bore 72 in which the supply leads to the armature windings 54 of the radial field motor-generator 48 and to the coil 74 of the auxiliary axial bearing 62 are led.

What is claimed:

1. A rotating machine assembly comprising a casing, a rotor in said casing, a radial field motor-generator and an axial field motor-generator, said axial field motor-generator including a stationary armature winding and means for generating an axial magnetic field and being operative for absorbing axial bearing forces acting on said rotor, said radial field motor-generator including a stationary armature winding and means for generating a radial magnetic field and being operative for absorbing radial forces acting on said rotor, said means for generating a radial magnetic field and said means for generating an axial magnetic field being mounted on said rotor, the magnetic field of said axial field motor-generator having a greater effective diameter than the magnetic field of said radial field motor-generator, the stationary armature windings of said radial field motor-generator and said axial field motor-generator each being subdivided into four winding quadrants, each winding quadrant having a separate regulating unit for regulating the current thereof, said axial field motor generator including means for controlling the regulating units thereof to control the movement of said rotor in two directions of rotation and in a first direction of spacial freedom, said radial field motor-generator including means for controlling the regulating units thereof to control the movement of said rotor in second and third directions of spacial freedom, said axial field motor-generator further including four gap sensors, each of said gap sensors being operative for sensing the gap between said axial field magnetic field generating means and a different quadrant of the stationary armature winding of said axial field motor generator, said means for controlling the regulating units of said axial field motor-generator being responsive to said gap sensors for controlling the regulating units of said axial field motor-generator to individually shift the current distribution in the phases of the different quadrants of said axial field motor-generator in order to control the movement of said rotor in said first direction of spacial freedom and in said two directions of rotation.

2. In the rotating machine assembly of claim 1, said axial field motor-generator and said radial field motor-generator each including no-load excitation permanent magnets, said no-load excitation permanent magnets being mounted on said rotor.

3. In the rotating machine assembly of claim 2, the movement of said rotor normally being effected by shifting the current distribution in the phases of the different quadrants of the armature windings of said axial field motor-generator and said radial field motor-generator relative to the respective permanent magnets thereof.

4. In the rotating machine assembly of claim 1, the stationary armature windings of said axial field motor-generator and said radial field motor-generator being of multi-pole design and including at least two poles per winding quadrant.

5. In the rotating machine assembly of claim 4, the stationary armature windings of said axial field motor-generator and said radial field motor-generator having phase numbers of greater than three, said axial field motor-generator and said radial field motor-generator including invertors for influencing the current distribution in the individual phases of the respective armature windings thereof.

6. The rotating machine assembly of claim 4 further characterized as including a stator having a yoke, said axial field motor-generator armature and said stationary field motor-generator armature including ring coils surrounding said yoke.

7. In the rotating machine assembly of claim 1, said axial field motor-generator control means and said radial field motor generator control means controlling the movement of said rotor by controlling the current flow to the respective armature windings thereof.

8. The rotating machine assembly of claim 1 further comprising an auxiliary electromagnetic axial force bearing for absorbing axial forces acting on said rotor, said auxiliary electromagnetic bearing including stationary armature windings.

* * * * *